United States Patent Office 3,817,746

Patented June 18, 1974

3,817,746

DUCTILE SUPERCONDUCTING ALLOYS

Chang C. Tsuei, Pasadena, Calif., assignor to the United States of America as represented by the United States Atomic Energy Commission No Drawing. Filed Nov. 14, 1972, Ser. No. 306,510
Int. Cl. C22c 9/00
U.S. Cl. 75—153 35 Claims

ABSTRACT OF THE DISCLOSURE

This invention provides an alloy for the commercial production of a ductile superconducting wire wherein superconductivity is produced by the proximity effect or by filament or both. In one embodiment a specific alloy of ductile non-superconductor and superconductor components is provided in a composite consisting of Cu and Nb having discrete randomly distributed Nb particles and/or filaments imbedded in and dispersed in close proximity throughout the composite to form an inhomogeneous system of proximately spaced boundaries between the non-superconducting and the superconducting components for effecting the production of continuous superconducting paths throughout the composite at low temperatures in both the superconductor and non-superconductor components. Other ductile elements for the respective components, comprise Ag, Au, Al, Ga, Ge, V, Sn, Ti or Si, in combination with each other or various alloys and compounds for use in the commercial production of ductile superconductors in accordance with this invention.

BACKGROUND OF THE INVENTION

This invention was made in the course, of, or under a contract with the United States Atomic Energy Commission.

In the past, various ductile superconducting wires made from Nb-Ti, Nb-Zr- Nb-Ti-Zr (with superconducting transition temperature $T_c \sim 10$ K.), or other ductile superconductors, have been considered for constructing superconducting magnets, motors or generators. However, these ductile wires have had relatively low critical fields, and low stability against high magnetic fields due to their poor thermal conductivity. To overcome this problem, these wires have been imbedded in a normal resistance matrix, such as described in the March 1967 Scientific American. However, these wires, which have been referred to in the art for ease of explanation as matrix stabilized superconductors, have been difficult and expensive to manufacture, e.g., because they have been drawn to small wire diameters, and/or they have been twisted as described in U.S. Pat. 3,662,093. Moreover, the bonds between these superconducting wires and their non-superconducting matrices, which have usually been copper, have often lacked physical strength enough to achieve high stability of performance in magnetic fields.

SUMMARY OF THE INVENTION

The present invention avoids the above-described problems by utilizing randomly distributed superconducting particles or filaments (e.g. elements such as Nb and V and intermetallic compounds such as $Nb_3$ Sn, $V_3$. Si or the like) imbedded in an dispersed throughout a ductile non-superconductor matrix, such as Cu. More particularly, it has been discovered that composites of a minor amount of superconductor particles in a major amount of a ductile non-superconductor component forming the matrix in accordance with this invention, provides a new class of superconducting alloys that are superconducting at a temperature as high as 20 K., that provide high critical current densities (>$10^3$ A./cm.$^2$), that provide high critical fields due to a pinning effect, that have a high degree of stability under the influence of high magnetic fields and high currents, and that provide new materials that can be manufactured into wires on a mass production scale. Hence, they are useful in constructing superconducting power transmission lines, magnets, motors and generators.

Briefly stated, the fundamental mechanism underlying the superconductivity observed in the alloy of this invention is the proximity effect. For example, in the composite of this invention containing a component that forms the particles in the non-superconductor component of the matrix, the particles form throughout the composite an inhomogeneous system of proximate boundaries between the two components for effecting the production of continuous superconducting paths at low temperatures. To this end, these proximate boundaries have the effect of providing for energy gap reduction in the superconductor component, and on the other side of the boundaries therefrom the existence of Cooper pairs, whereby the non-superconductor first component may have superconducting behavior induced therein throughout the composite. Stated another way, the inhomogeneous system of proximate boundaries between the superconductor and non-superconductor components provides continuous superconducting paths throughout the composite in both the first and second components. For alloys containing a high concentration of the superconductor component in accordance with this invention, the proximity effect of the superconductor particles is combined with a filamentary effect that provides additional continuous superconducting paths throughout the composite.

In one embodiment, this invention provides a ductile, intermetallic superconducting alloy for making a superconductor wire, comprising a composite of a ductile non-superconductor first component, including 96 at. percent Cu, and a ductile superconducting second component, including 4 at. percent Nb, forming discrete randomly distributed particles imbedded in and dispersed in close proximity throughout the first component to provide an inhomogeneous system of proximtely spaced boundaries between the superconductor second component and the nonsuperconductor first component throughout the composite for effecting the production of continuous superconducting paths at low temperatures in accordance with the proximity of the particles, whereby under the influence of an electrical potential across the composite, the non-superconductor first component is induced to have superconducting behavior. This alloy, since it is ductile, is easily elongated by cold-working into wire. Also, dopants and various compounds and alloys can be used. Moreover, the wire of this invention can be annealed in long lengths in commercial production.

It is thus a principal object of this invention to provide a commercially feasible superconducting alloy, and an economic method for forming a ductile, high critical magnetic field superconductor from the alloy for providing superconductivity by the proximity effect.

The above and further novel features and objects of this invention will become apparent from the following detailed description and the novel features will be particularly pointed out in the appended claims.

DESCRIPTION OF THE PREFERRED EMBODIMENTS

While the preferred embodiment of this invention is an alloy for forming therefrom composite superconducting wire, it will be understood by one skilled in the art that a variety of other uses are apparent from the following detailed description. For ease of explanation a wire is described herein as being made from one embodiment of the alloy of this invention for achieving particular parameters and characteristics. However, by using other embodiments of the alloy of this invention, as understood in more detail hereinafter, a variety of critical temperatures, and critical currents can be achieved commercially for a wide variety of scientific and commercial applications.

In understanding this invention, it has been discovered that in the proximity of a boundary between a coating of a superconducting superconductor s-material on top of a non-superconductor metal designated as n-material, the properties of the electrons on both sides of the boundary are modified. For example, it is believed that in the superconducting material the energy gap is reduced, and on the other side of the boundary. Cooper pairs exist in the n-material, whereby the latter may have superconducting behavior induced therein. A theoretical discussion of this proximity effect, which was extentively developed by de Gennes in 1964, is provided on p. 243 et seq. in, "An Introduction to the Theory of Superconductivity," by Charles G. Kuper, Clarendon Press, Oxford, 1968.

Should these boundaries be randomly distributed by dispersion throughout a composite of s- and n-components in accordance with this invention, this composite provides superconductivity by the proximity effect. Also, good bonding of the s-material to the n-material is achieved and oxidation is not a problem, such as it is with coatings. Additionally, since the composite of this invention is ductile, this composite can be cold-worked economically into wire, tapes, ribbons, etc., by drawing rolling, etc.

Suitable s- and n-components for the alloys of this invention, comprise ductile first and second components selected from the group consisting of normal resistance metal elements and standard superconductor elements that have low mutual solubilities in each other. In this regard, these components may comprise these elements alone, a combination of these elements, or combinations of one or more of these elements with each other and/or other ductile alloys or compounds. For example, a list of these first and second components, comprises the ductile components selected from the group consisting of Cu, Ag, Au, Ga, Ge, V, Sn, Ti, Si, Nb-Al-Ge, Nb-Ti, Nb-Zr, Nb-Ti-Zr, Nb, Al, Cu-Sn, Cu-Al, Cu-Ga, Nb-Ga-Cu, Nb-Al, Nb-Al-Ge-Cu, V-Ga-Cu, $SnNb_{80}Ti_{20}$, $V_3Si$, $Nb_3Sn$, $Nb_3(Al_{0.75}Ge_{0.25})_1$, $V_3Ga$, and $Nb_3Ga$ for providing a super-conducting alloy at a temperature below 20 K. depending on the alloy, composition, and heat treatment.

The non-superconducting and superconducting components are distinguished by conventional tests for determining their resistance. According to standard practice, the division between the n- and s-components is easily determined, since only the superconductors have a sharply dropping resistance to zero below some critical temperature. In contrast, the non-superconducting normal resistance n-components have a greater resistance than zero.

Mutually decreasing solubilities with decreasing temperatures for the first and second n- and s-components, is used in precipitating the s-components in the n-components matrix. This solubility decreases, e.g., from about 1% at high temperature downwardly at room temperatures or above. For example, Nb and Cu have decreasing solubilities from high to low temperatures. Tests have shown Nb in Cu to have solubilities at below 1100° C. of less than 1% (it is estimated to be about 0.10 at. percent at room temperature). These mutually decreasing solubilities with temperature are determined by standard metallographic means and methods, such as visually.

Ductility is determined by drawing castings or ingots through standard dies to wire diameters of down to at least 0.01".

Advantageously, the first n-component forms grain boundaries upon solidification from a melt, whereby the particles of the second or s-component, while precipitating throughout the n-component, particularly precipitate along the grain boundaries of the n-component where they are aligned in close proximity to form proximate boundaries between the n- and s-components, and proximate superconducting paths in, between, across and through each other, the n- and s-components, and along and around the grain boundaries.

The critical particle size for the s-component, which forms the discrete particles of this invention, is provided by randomly precipitating particles having a fairly large size in an n-component forming a matrix, the particle diameters being determined by standard metallographic techniques, such as visually. The upper size limit can be varied, depending on the concentration of the s-component in the n-component, the specific components employed, and their finishing. For example, cold-working has been found to elongate and align the particles, e.g. along the grain boundaries of the n-component in a direction along the axis of the elongation without adverse effects, while annealing tends to decrease the size of the large particles and/or to produce microscopic and/or submicroscopic particles, which are smaller than originally precipitated particles, probably by recrystallization. This annealing in some cases sharpens the number of continuous superconducting paths, e.g., along the grain boundaries in the n-component that are formed in the initial precipitation.

The initial average interparticle proximity, as measured visually by the distance between the large precipitated particles is comparable to the coherence length (of the order of 1000 A.) so that the Cooper pairs form a continuous path or paths for superconductivity. On the other hand, annealing may reduce the size of at least some of the larger Nb particles in the Cu matrix, and the number of smaller particles increases after annealing at 300° or 600° C. for at least several hours to produce interparticle distances of up to ~5000 A. This reduction in size of the larger Nb particles does not destroy the superconductivity, but it is consistent with the observation that in annealed samples of a wire, the slope of the first sharp resistivity drop with decreasing temperature is reduced at ~9 K. Additionally, the proximately spaced boundaries between the n- and s-components, e.g. the interface between the outside of the particles and the n-component in the matrix, still provide superconductivity throughout the composite in paths by the proximity effect in both the n- and s-components, and in, between, across, through and/ or around the boundaries and/or the composite even after drawing and/or annealing.

In one embodiment of the alloy of this invention, which is cold-worked by drawing an ingot with up to over 50% or more area reduction to a wire of 0.01 inch diameter, the s-component forms particles, having different sizes comprising small and fairly large sizes in an n-component forming a matrix, the particles being elongated along the grain boundaries of the n-component. Continuous filaments of the s-component are also possible along the grain boundaries.

The interparticle proximity, as measured by the distance between the particles, forms the described Cooper pairs, as understood by reference to one side of one boundary. In this regard, it will be understood that paths for the described superconductivity occur in the neighborhood of these boundaries adjacent and proximate to interfaces between the n- and s-components in the wire between the outside of the particles and the n-component in the matrix throughout the composite formed by wire.

Suitable cryogenic means for the wire comprise an insulated dewar having liquid, such as liquid helium or hydrogen therein for cooling the wire to a low temperature for effecting the creation of continuous current flow paths in both the s- and n-components in accordance with the proximity of the particles in the composite of the wire. By cooling the composite to a temperature below its critical temperature which in one embodiment is ~8–9 K. in the case of a Nb-Cu composite in wire, these continuous paths in both the s- and n-components are superconducting.

Suitable electrical potential means, such as a battery, flux pump, or pulsed signal source, comprising either an A.C. or a D.C. source, produces an electrical potential across the wire from one end to the other end thereof to produce a desired superconducting current along the axis of the wire in the composite thereof.

The following are examples of this invention:

Example I

A major amount of pure Cu and a minor amount of pure Nb were melted in He and rapidly cooled to form an alloy in a composite having Nb particles precipitated throughout the solid Cu and along and around the grain boundaries of the Cu. After cross-sectional area reduction of the ingot by cold-working, the resistivity of rolled samples of the composite were measured.

The results of microstructure studies indicated that there were two distinct types of Nb precipitates in the Cu matrix. The large precipitates (average size ~10 μm.) randomly distributed in the alloy were probably formed at high temperature when the bulk alloy was still in its liquid state. The small precipitates that were visible under the magnification used (11,000×) appeared to be discrete particles of average size <0.1 μm. It was theorized that there were even smaller size particles in these relatively small precipitates. The small precipitates tended to form along grain boundaries, probably as a result of solid state precipitation.

The cold rolling of the alloys aligned and elongated the precipitates in the rolling direction.

In summary, the metallographic results definitely confirmed the existence of discrete randomly distributed particles, which were identified as essentially Nb particles according to the Nb-Cu phase diagram. The distribution of the particle sizes ranged from the relatively large size visible (~10μm.) to submicroscopic size. There was a distribution of interparticle distances ranging from zero to a few μm. In view of the distribution of the superconducting Nb particles found, it was theorized that the observed infinite conductivity in the $Cu_{100-x}Nb_x$ alloys with $x=3$ was due to leakage of Cooper pairs in Nb particles into the Cu-matrix, with the average interparticle distances comparable with the coherence length (of the order of 1000 A.) so that the Cooper pairs formed a continuous path for superconductivity.

Example II

Example I was repeated for alloys having a Nb content larger than 3 at. perecnt Nb and most of the Nb particles precipitated on the grain boundaries were so closely distributed that they were practically in contact to provide a continuous superconducting path by Nb filaments along some of the boundaries. For alloys containing high concentrations of the s-component, the filament effect was essentially the mechanism responsible for the observed superconducting transition.

Example III

Example I was repeated to determine the effects of small amounts of an Al dopant on the alloy. It was found that the dopant sharpened the superconducting transition, and alloys containing only 3 at. percent Nb (such as $Nb_{3.0}Al_{1.0}Cu_{96}$) became superconducting at 9 K.

Typical resistivity vs. temperatures for various at. percent's of Nb, Al and Cu in Nb-Al-Cu alloys were as follows:

TABLE I $Nb_{3.0}Al_{1.0}Cu_{96.0}$ (T–588) zero resistance at ~8.5 K,
$Nb_{5.0}Al_{1.67}Cu_{93.33}$ (T–590) zero resistance at ~8 K,
$Nb_{7.0}Al_{2.33}Cu_{90.67}$ (T–591) zero resistance at ~8.2 K, Example IV Example I was repeated with a $(V_3Si)Cu$ alloy having a 5 at. percent s-component of $V_3Si$ and a 95 at. percent n-component of Cu. The resistivity sharply reduced from about $2.44\times10^{-6}$ ohm-cm. at about 16 K. to zero at about 7 K.

Example V

Example I was repeated with a NbSnCu alloy having 3 at. percent Sn added to 5 at. percent of Nb, and 97 at. percent of Cu. The resistivity sharply reduced from about $8.3\times10^{-6}$ ohm-cm. at about 16 K. to zero at about 13.5 K. For $Nb_{3.75}Al_{1.25}Cu_{95}$, the resistivity reduced sharply from about 8.5 K. to zero at about 7.3 K.

Example VI

Example I was repeated with an alloy $Nb_{3.75}Al_{1.25}Cu_{05}$ (as cast) worked into wire 0.01" diam. which didn't affect its superconductivity as measured in its as rolled condition and after annealing at 300° C. for one hour.

Example VII

The previous examples were repeated with rapidly cooled ingots, which could be directly rolled to wires 1 mm. x 1 mm. cross-section.

Various characteristics, comprising critical current and upper critical field ($H_{c2}$), as a function of temperature (T), were determined for the alloys tested. These were high as expected by calculation, which showed, e.g., that $Nb_5Sn_3Cu_{92}$ should have a critical field of about 200 kg.

It was found that the high critical current density ($>10^{4-5}$ A./cm.$^2$) was due to the pinning effect of the particles imbedded in the alloy.

High thermal stabilities at high current density were due to the fact that all the superconducting alloys had a high copper to superconductor ratio of about 50 to 1, and a tight metallurgical bond between the s- and n-components.

When drawn into wires on a mass production scale, the estimated cost is about 100 times cheaper than corresponding wires available heretofore. These wires, which can provide reliable joints between the wires by conventional techniques, such as arc-welding or laser beam welding, can be prepared by vacuum induction melting or by other well established large scale production methods, such as consumable arc melting techniques in an inert atmosphere.

For some of the examples, annealing, between rollings of large area reduction were used without adverse effects. In some cases, annealing in a vacuum sharpened the superconducting transition, increased it or increased the critical current density. For $Cu_{100-x}Nb_x$ alloys with $x=3$, transition was at 9 K. in the as-rolled state. For $$Nb_5Sn_3Cu_{92}$$

a superconducting transition temperature of 17 K. was obtained by annealing at 600° C. for two days.

Example VIII

Example I was repeated by induction melting the constituents in glassy carbon crucibles under an argon atmosphere. The weight loss was less than 0.2%. After melting, there was a silvery coating on the ingot that was removed by boiling $H_2SO_4$. The ingot was rolled into an approximately rectangular rod with a 25% reduction in cross-sectional area. This rolled composite was cut into two pieces, which were machined into 2 x 20 mm. rods.

One specimen was etched in dilute nitric acid to reduce its diameter to less than 1 mm. Its electrical resistivity as a function of temperature was measured using a standard four-probe technique at a current density of about 200 A./cm.$^2$.

Another speciment was annealed at 800° C. for about two days, and its diameter was reduced by etching.

Annealed specimens of $Cu_{99.8}Nb_{0.2}$ and $Cu_{99.5}Nb_{0.5}$ showed no electrical resistance below 3 K. as a result of leakage from the Cooper pairs. By no resistance, it is meant that the potential drop across a rod ~10×0.5 mm. was less than $10^{-8}$ volts at a current of 0.5 A. For low concentrations, such as $Cu_{100-x}Nb_x$, with $x=0.1$, 0.2, and 0.5, the decrease in resistivity at decreasing temperatures became more pronounced with increasing Nb concentrations. For alloys of relatively high Nb content from 1.5 at. percent to 5.0 at. percent, the resistivity of the alloys did not depend linearly on concentration.

The metallographic results showed two distinct types of randomly distributed Nb precipitates in the Cu matrix having interparticle distances from zero to a few μm (av. 1000 A.). The large precipitates of Nb (av. size ~10 μm.) were randomly distributed in the alloy with interparticle distances of about 10 to 30 μm. The small precipitates of Nb had an average size of 1< μm., which tended to form along the grain boundaries, and these were aligned in the rolling direction. The large particles were abundant in alloys containing more than 1.5 at. percent Nb and the reverse was true for the small particles.

Example IX

Example I was repeated with alloys having varying amounts of the n-component, i.e., a Cu n-component, and various amounts of the s-components, such as Nb, with and without a dopant, such as Al that was also varied in its amount, and the alloys and composites produced therefrom in the shape of wires were superconducting from about 3 at. percent to up to at least 7 at. percent of said Nb, and up to at least ~90.67 at. percent of said n-component.

Example X

Example I was repeated and with $Cu_{100-x}Nb_x$ alloys, where $x=>3$ and the alloy was superconducting with Nb particle diameters of up to 20 μm. Smaller amounts of Nb produced smaller particle diameters down to 0.1 μm.

Example XI

Example I was repeated and with small amounts of Nb, and larger amounts of Nb in composites that were annealed, and the composites were superconducting with interparticle distances up to 5000 A.

Example XII

Example I was repeated for various other alloys forming composites having n-component matrices and s-component particles therein selected from metallic elements, alloys and compounds, and these composites were found to be superconducting.

Example XIII

Example I was repeated for an alloy of 95 at. percent Cu, 1.25 at. percent Si, and 3.75 at. percent V, that was cold-worked into a wire, which was superconducting at a wire diam. of 0.01".

Example XIV

A wire, ca. 2 cm. long and 0.5 mm. diameter, of an alloy $Nb_5\ Sn_2Cu_{93}$, while being maintained at a temperature of 4.2° K. was disposed in a magnetic field of 46 kilogauss, which was the maximum field strength that was afforded by the apparatus used, and was found to maintain superconductivity.

Example XV

A sample of each of the alloys $Nb_5Cu_{95}$ and $$Nb_5Al_{1.67}Cu_{93.3}$$

was separately disposed, while being maintained at a temperature of 4.2° K., in a magnetic field of progressively increasing field strength. The resistivity of each sample was measured and monitored using standard four-probe technique. It was thereby observed that each of the samples was superconductive at magnetic field strengths below 8 kilogauss, and that the superconductivity of each became quenched when the field strength reached 8±0.1 kilogauss whereupon each sample assumed normal conductivity.

Example XVI

A sample of each of the same two alloy compositions as used in Example XV, supra, was separately subjected, while being maintained at a temperature of 4.2° K., to a progressively increasing current density. The resistivity of each sample was measured and monitored using standard four-probe technique. It was thereby observed that each sample was superconductive at current densities below $3.5\times10^4$ amp./sq. cm., and the superconductivity of each became quenched when the current density reached $3.5\times10^4$ amp./sq. cm. whereupon each sample assumed normal conductivity.

What is claimed is:

1. Ductile, intermetallic superconducting alloy for providing superconductivity by the proximity and/or filament effect, comprising a composite of:
   - a. a major amount of a ductile normally non-superconducting first component form grain boundaries; and
   - b. a minor amount of a superconducting second component dispersed in said first component by precipitation to form an inhomogeneous system of proximate boundaries between said first and second components and proximate paths in, between, across and through said boundaries and along and around said grain boundaries;
     - said second component dispersed as particles throughout the body of said component to form a plurality of said proximate boundaries and paths imbedded throughout said first component;
     - said proximate boundaries providing a plurality of continuous superconducting paths throughout said composite in both said first and second components at low temperatures.

2. The alloy of claim 1 in which said particles range in size downwardly from about 20 μm. cross-section.

3. The ductile intermetallic superconducting alloy of claim 1, containing at least 90.67 at. percent of said ductile non-superconducting first component.

4. The ductile intermetallic superconducting alloy of claim 1 in which said particles have a diameter up to 20 μm. and an interparticle spacing of up to 5000 A.

5. The ductile intermetallic superconducting alloy of claim 1 in which said first component contains at least one non-superconductor element, and said second component contains at least one ductile superconductor element.

6. The ductile intermetallic superconducting alloy of claim 1 in which said first component consists of a ductile non-superconductor intermetallic alloy, and said second component consists of a ductile superconductor alloy.

7. The ductile intermetallic superconducting alloy of claim 1 in which said first component consists of a ductile non-superconductor intermetallic alloy, and said second component consists of a superconductor compound.

8. The ductile intermetallic superconducting alloy of claim 1 in which said second component contains at least 4 at. percent Nb in which a majority of said Nb forms precipitates of discrete particles on the grain boundaries of said first component, some of said particles being so closely distributed in said first component that they are practically in contact with each other, while others thereof are in contact.

9. The ductile intermetallic superconducting alloy of claim 1 in which said composite consists of a first component including a least about 96 at. percent Cu having Al added thereto in an amount of at least about 1 at. percent of said composite, and a second component including about 3 at. percent Nb, said alloy becoming superconducting at ~9 K.

10. The ductile intermetallic superconducting alloy of claim 1 in which said first component consists of a matrix of copper, and said second component comprises $V_3Si$ particles distributed in said matrix.

11. The ductile intermetallic superconducting alloy of claim 1 in which said first component consists of a matrix of at least about 95 at. percent Cu, and said second component consists of a compound up to 5 at. percent V and Si for providing superconductivity at 8 K.

12. The ductile intermetallic superconducting alloy of claim 1 in which said first component consists of about 92 at. percent Cu and said second component consists of about 5 at. percent Nb and about 3 at. percent Sn, said composite being annealed at 600° C. for a sufficient length of time for providing superconductivity at between about 18–4.2 K.

13. The ductile intermetallic superconducting alloy of claim 1 which is formed by cooling a casting containing a composite of about 95 at. percent Cu, 1.25 at. percent Si and 3.75 at. percent V that is cold-worked into a wire of 0.01″ diameter to produce alignments of said particles therein.

14. The ductile intermetallic superconducting alloy of claim 10 in which the spacings of said particles range from zero up to about 5000 A.

15. The ductile intermetallic superconducting alloy of claim 1 in which said second component consists of initially formed particles, which are relatively large, and smaller particles that are up to only about 0.1 $\mu$m. in diameter, said large particles being up to about 20 $\mu$m. in diameter.

16. The ductile intermetallic superconductor of claim 1 in which the ductile non-superconducting first component is copper, and the ductile superconducting second component is niobium.

17. The ductile intermetallic superconductor of claim 1 in which the ductile superconducting second component consists of discrete closely spaced particles in a matrix of up to >99 at. percent Cu, which forms said first component, said particles being small enough to produce said paths at low temperatures by a proximity effect resulting from the leakage of Cooper pairs.

18. The ductile intermetallic superconducting alloy of claim 1 in which said proximities are aligned by cold-working a composite containing between 3.0 and 7.0 at. percent Nb, which forms said second component, with the remaining at. percent of said composite being Cu, which forms said first component.

19. The ductile intermetallic superconducting alloy of claim 1 in which said second component forms discrete particles the size, alignment and spacings of which determine the proximity of said boundaries between said first and second components.

20. Ductile intermetallic superconductor wire comprising a composite of:

a. an elongated alloy of a ductile non-superconducting first component; and b. a superconducting second component forming discrete randomly distributed particles imbedded in and dispersed in close proximity throughout said first component to provide an inhomogeneous system in a composite of proximately spaced boundaries between said superconducting second component and said non-superconducting first component throughout the composite for effecting the production of continuous superconducting paths at low temperatures in accordance with the proximity of said particles, said proximity having the effect of providing for energy gap reduction in said superconducting second component, and on the other side of said boundaries therefrom the existence of Cooper pairs, whereby the non-superconducting first component may have superconducting behavior induced therein throughout said composite at low temperatures.

21. The ductile intermetallic superconductor wire of claim 20 in which said composite has the shape of an axially aligned wire with the axis of said wire and said particles aligned and elongated in and around said grain boundaries in a direction along said axis of said wire.

22. The ductile intermetallic superconductor wire of claim 20 in which said particles have a range of particle sizes and spacings, and said superconductor wire also has continuous superconducting filaments forming continuous superconducting paths at low temperatures in said superconductor wire.

23. The ductile intermetallic superconductor wire of claim 20 in which at least some of said particles provide continuous superconducting paths across said boundaries at low temperatures due to the proximity of said particles to each other.

24. The ductile intermetallic superconductor wire of claim 20 in which said superconducting paths are continuous from one end of said wire to the other end thereof for effecting a superconducting current flow in said wire in accordance with said end-to-end continuity thereof.

25. The method of dispersing superconducting particles in a composite having a normally non-superconducting matrix to provide superconductivity by the proximity effect, comprising the steps of:

a. melting a ductile, non-superconductor first component of said composite with a superconductor second component of said composite, said first and second components having mutually low solubilities in each other; and b. rapidly cooling said melted first and second components to form a composite with an inhomogeneous system of proximately spaced boundaries between said first and second components inside and throughout said composite.

26. The method of claim 25 in which said cooling step is followed by the step of cold-working said composite to elongate said composite and said boundaries therein.

27. The method of claim 25 in which said cooling step is followed by the step of cold-working said composite to form a longitudinally extending wire.

28. The method of claim 25 in which said cooling step is followed by the step of annealing said composite without destroying the proximity of said boundaries.

29. The method of claim 25 in which said cooling step produces superconducting filaments in said composite in accordance with the concentration of said second component in said composite.

30. The method of claim 25 in which following said cooling step said composite is sequentially finished into a wire by cold-working and annealing.

31. The method of claim 25 in which said cooling step forms first particles of relatively large size by crystallization of said second component at high temperatures from the melt of said first and second components, said relatively large particles being formed along grain boundaries of said first component to provide continuous superconducting paths.

32. The method of forming a superconductor, comprising the steps of:

a. cooling a melt of first and second components having mutually low solubilities to form a composite structure having a ductile superconducting first component of discrete particles dispersed in a normal resistance metal matrix formed from a non-superconducting second component that does not contain said first component for effecting the production of an inhomogeneous system of randomly spaced boundaries between said superconducting first component and said non-superconducting second component throughout said composite, b. cold working said composite to form an elongated conductor of a desired shape and size having said particles aligned and elongated therein by said cold-working; and c. heat treating said elongated conductor at a temperature of 800° for a time that is sufficient to affect the size of said particles by recrystallization.

33. A ductile, intermetallic superconducting electrical conductor, comprising:

a. a matrix consisting of a ductile metallic material that is by itself non-superconducting at below about 20° K.; and b. a small amount of a superconducting material dispersed in and distributed throughout said matrix in the form of discrete and spaced-apart solid particles.

34. The conductor of claim 33 in which the superconducting material is selected from the group consisting of a metallic element, an alloy, and a compound.

35. The conductor of claim 33 in which the matrix material is selected from the group consisting of a metallic element, and alloy, and a compound.

References Cited

UNITED STATES PATENTS

| | | | |
|---|---|---|---|
| 3,471,925 | 10/1969 | El Bindari | 29—599 |
| 3,728,165 | 4/1973 | Howlett | 148—11.5 R |
| 3,731,374 | 5/1973 | Svenaga et al. | 29—599 |

L. DEWAYNE RUTLEDGE, Primary Examiner

E. L. WEISE, Assistant Examiner

U.S. Cl. X.R.

29—191.2, 194, 199; 75—134 V, 174; 148—11.5 R